Figure 1B:
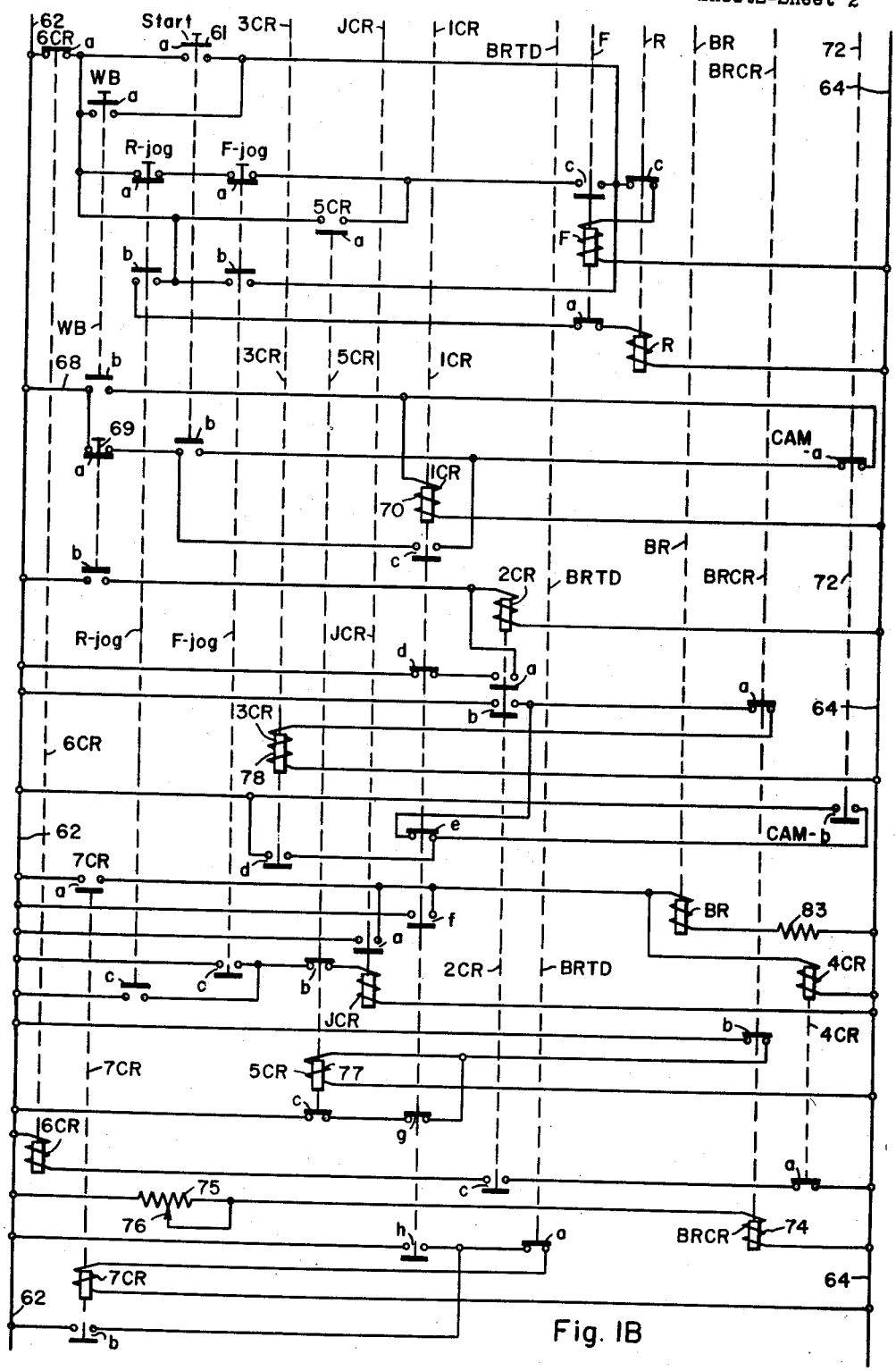

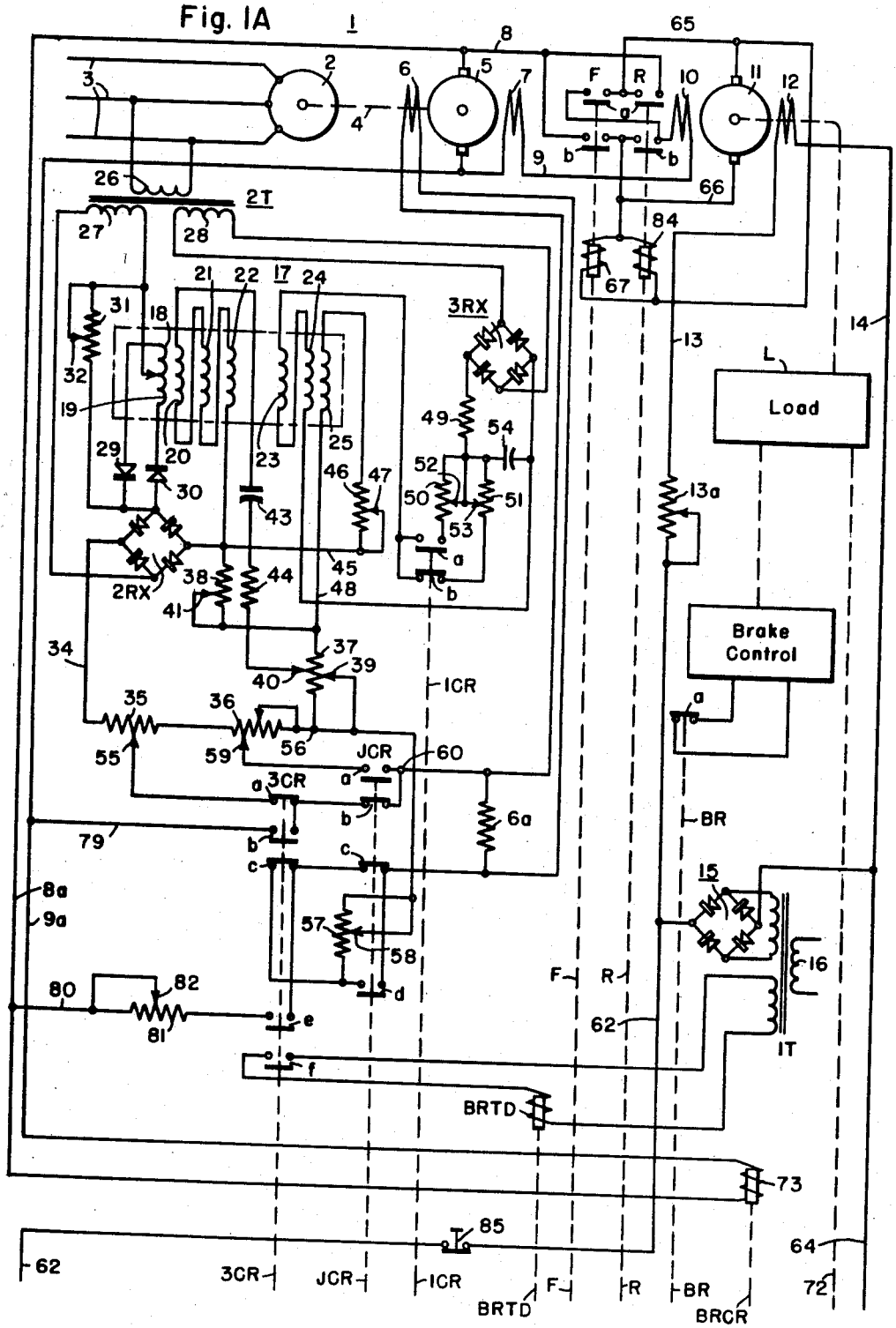

United States Patent Office 3,059,161
Patented Oct. 16, 1962

3,059,161
MAGNETIC AMPLIFIER ACCELERATION-DECELERATION CIRCUIT FOR MOTOR CONTROL
Francis T. Bailey, East Aurora, and Fletcher E. McLane, Lancaster, N.Y., assignors to Westinghouse Electric Corporation, East Pittsburgh, Pa., a corporation of Pennsylvania
Filed Apr. 18, 1958, Ser. No. 729,429
8 Claims. (Cl. 318—141)

This invention relates to a magnetic amplifier acceleration-deceleration control circuit for a motor and more particularly to a magnetic amplifier control for a motor providing smooth linear acceleration and deceleration of the motor from zero speed to maximum speed and return with no abrupt changes in speed.

It is necessary in some drive control systems for electric motors to provide jumpless speed changes during acceleration and deceleration periods. Some systems for providing this type of control have used the application of a flywheel to the motor to absorb the abrupt changes in speed due to acceleration and deceleration control. This type of system, however, provides only moderate modification of the abrupt changes without actually eliminating the abrupt changes as desired. This type of system may be adequate for some types of control, however some control systems could not tolerate the minor abrupt changes appearing in the output that is not absorbed by the flywheel associated with the motor.

It is therefore an object of this invention to provide a control circuit for power supplied to a driven motor to provide smooth speed changes in acceleration and deceleration control periods.

It is another object of this invention to provide smooth speed control that is not subject to changes in armature current supplied to the drive motor.

It is another object of this invention to provide magnetic amplifier control of a supply generator capable of supplying load current to a drive motor in which the magnetic amplifier provides generator excitation control that is not subject to changes in armature current.

Other objects, purposes and characteristic features will become clear as a description of the invention progresses.

FIGS. 1A and 1B together constitute a schematic of one embodiment of the control circuit necessary for proper motor control.

In practicing this invention there is provided a magnetic amplifier control of a shunt field winding of a supply generator for a motor intended to be accelerated and decelerated. The magnetic amplifier is controlled to provide smooth acceleration and deceleration of the motor through varying power delivered by the generator through the control of its shunt field winding. The excitation of the shunt field winding is varied linearly from minimum to maximum or maximum to minimum over a time period established by the magnetic amplifier circuit. In this way the power supplied to the motor is varied from minimum to maximum or from maximum to minimum, whichever the case may be, in direct proportion to the excitation supplied by the magnetic amplifier and without regard to the armature current of the generator involved.

The circuit of the drawing comprises a motor generator set 1 provided with a motor 2 preferably supplied by a three-phase alternating current over the conductors 3 and controlled by a disconnect switch of any suitable type (not shown). The motor 2 is connected through a mechanical connection 4 to the armature of a generator 5 provided with a shunt field winding 6 having a shunt resistor 6a and a series field winding 7. The output of the generator 5 is fed over the conductors 8 and 9, the contacts a and b of forward or reverse contactors F or R respectively, the motor series field winding 10 to the motor 11 armature. The output from the generator 5 is direct current and is supplied to the direct current motor 11 over the previously recited path. When contactor F is energized, the motor 11 is rotated in a forward direction. With contactor R energized and contactor F deenergized the motor then reverses its direction. The motor 11 is provided with a shunt field 12 energized over the conductors 13 and 14 and series resistor 13a from the full wave rectifier 15 receiving its energy from a transformer 1T having its primary 16 connected across one phase of the three phase input conductors 3.

To control the shunt field 6 of the generator 5 supplying load current to the drive motor 11, a magnetic amplifier 17 is used. The magnetic amplifier 17 is provided with a pair of load windings 18 and 19, a plurality of series connected rate-of-change negative feedback windings 20, 21 and 22, a pair of series connected main control windings 23 and 24 and a positive feedback winding 25. The magnetic amplifier receives its control power through a transformer 2T having a primary winding 26 and two secondary windings 27 and 28. The secondary winding 27 is connected through a rectifier 2RX, a pair of rectifiers 29 and 30 oppositely poled, to the load control windings 18 and 19. The load windings 18 and 19 are provided with a parallel connected resistor 31 having an adjustable tap 32, the purpose of which is explained hereinafter. The output of the full wave rectifier 2RX is connected through the conductors 33 and 34 to a series circuit including a rheostat 35 and resistance 36 connected in series and having in parallel therewith the shunt field 6 of the generator 5. Also connected in series with a rheostat 35 and resistance 36 is the resistance 37 and resistance 38 each of which is provided with variable taps. The resistor 37 is provided with variable taps 39 and 40. The resistor 38 is provided with a variable tap 41. The rate-of-change negative feedback windings 20–22 are connected through the conductor 42 to one side of the output of the rectifier 2RX with the remaining terminal of the series connected windings connected through a capacitor 43 and current limiting resistor 44 to the variable tap 40 of the resistance 37. The capacitor 43 and resistor 44 cooperate to differentiate the voltage impressed across the output of 2RX. The positive feedback winding 25 is connected through the conductor 45 to one side of the full wave rectifier 2RX through a variable load resistor 46 having a variable tap 47. The other terminal of the positive feedback winding 25 is then connected to a point between the resistor 37 and resistor 38 so that the voltage developed across the resistor 38 is applied to the positive feedback winding 25. The main control windings 23 and 24 of the magnetic amplifier 17 are connected to the secondary 28 of the transformer 2T through the full wave rectifier 3RX and a resistance network capable of establishing the rate of acceleration and deceleration of the motor 11 through control of the magnetic amplifier 17. The rectifier 3RX has an output filter comprising a series resistor 49 and a shunt capacitor 54. The resistance network comprises a pair of parallel variable resistors 50 and 51 provided with variable taps 52 and 53, respectively. The resistor 50 is the acceleration control resistor and is connected through a normally open contact of a control relay 1CR (to be described hereinafter). The deceleration resistor 51 is connected through a normally closed contact of the relay 1CR to the remaining terminal of the control winding 23. The remaining control winding 23 is connected to the other output terminal of the full wave rectifier 3RX. The resistor 51 is of much higher resistance than the resistance 50 for causing the magnetic amplifier to operate at the desired points on its characteristic curve.

The generator shunt field 6 is connected between the variable tap on the rheostat 35 and a point 56 located between the resistors 36 and 37 through the contacts *a* and *b* of the control relays 3CR and JCR, respectively, these contacts being closed when the relays are deenergized. The contacts *c* of the relays JCR and 3CR are also closed and series connected with a resistance 57 having a variable tap 58 connected to the point 56. In parallel with the contacts *c* of the relays 3CR and JCR is a normally open contact *d* of the relay JCR. A variable tap 59 on the resistor 36 is then connected through a normally open contact *a* of the relay JCR to the junction point 60 for a slow speed operation, the purpose of which will be made clear in the description of the operation and the description of the different control relays.

Operation of the control relays will be explained in connection with operation of the entire circuit and is set forth as follows: if we assume that power is being delivered over the conductors 3 from a three-phase source (not shown) to the alternating current motor 2 it can be seen that the armature of the generator 5 is rotated by the mechanical connection 4 in response to the energy being delivered to the motor 2. At the same time energy is supplied to the magnetic amplifier by a transformer 2T with all windings being energized except for the rate-of-change negative feedback winding which responds only to changing current within the generator shunt field circuit. The main control winding of the magnetic amplifier is energized over the decelerating circuit resistor 51, however, the resistance of this resistor is of such high value that the main control winding current is maintained at such a low level that the magnetic amplifier provides only minor shunt field excitation which would be inadequate to cause rotation of the motor if the motor were connected to the generator. The winding 16 of transformer 1T causes secondary winding 16a to supply shunt field 12 of the motor 11 with excitation. The system is now ready for further start operation in which the load is picked up by the motor 11 and moved. In order to start this operation the start button 61 is depressed. Depressing the start button 61 completes an energizing circuit from the conductor 62 connected to one output terminal of the rectifier 15 and normally closed contact *a* of the relay 6CR, the contact *a* of the start button 61, the normally deenergized closed contact *c* of the reverse relay R, the winding of the forward contactor F to the conductor 64 connected to the other output terminal of the full wave rectifier 15. Energization of the winding 63 of the forward contactor F causes the normally closed deenergized position contact *d* of the contactor to interrupt any possible energizing circuit for the reverse contactor R and the contact *c* of the contactor F to close a stick circuit for the forward contactor F, the contacts *b* and *a* of the contactor F to close and provide an energizing circuit for the motor 11 from the generator 5 over the conductors 65 and 66. The connections to the motor 11 over the conductors 65 and 66 is such that the motor is driven in a forward direction and this direction is established by the closed contacts *a* and *b* of the forward contactor F. The forward contactor F is provided with a bias winding 67 connected across the conductors 65 and 66 to provide additional pickup bias for the contactor contacts when the start button is depressed.

The contact *b* of the start button 61 upon becoming closed energizes a pickup circuit for the relay 1CR and can be traced from the conductor 62 over the conductor 68. The normally closed contact *a* of the stop button 69, the now closed contact *b* of the start button 61, the now closed contact *a* of the cam switch 1, the relay winding 70 of the relay 1CR and through the conductor 71 to the conductor 64.

Energization of the relay 1CR causes the armature of the relay to move, closing its contact *a*, opening its contact *b*, closing its stick circuit through its contact *c*, interrupting a stick circuit for a relay 2CR through its contact *d*, opening its contact *e* associated with a control relay 3CR, to be explained hereinafter, closing its contact *f* associated with the control relays 4CR and BR, also to be explained hereinafter, opening its contact *g* associated with a stick circuit for a control relay 5CR, to be explained hereinafter, and closing its contact *h* associated with the control relay 7CR, to be explained hereinafter.

The closing of contact *h* of relay 1CR causes the relay 7CR to be energized over a circuit from the power conductor 62 through the now closed contact *h* of the relay 1CR, the closed contact *a* of a timing relay BRTD, the winding of the relay 7CR, to the power conductor 64. Energization of the relay 7CR causes this relay to close its contacts *a* and *b* resulting in the completion of an energization circuit for the relay 4CR and the brake control relay BR over the now closed contact *a* of the relay 7CR. This circuit can be traced from the power conductor 62 through the now closed contact *a* of the relay 7CR, the winding of the relay 4CR, to the power conductor 64, for energizing the relay 4CR. The relay BR winding is also energized over the now closed front contact *a* of the relay 7CR, the winding of the relay BR and a current limiting resistor 83 with the relay winding of the relay BR in parallel with the winding of the relay 4CR. The contact *b* of the relay 7CR completes a stick circuit for the relay 7CR eliminating the necessity for the contact *h* of relay 1CR in the energizing circuit for the control relay 7CR.

Energization of the relay 4CR causes the relay to open its contact *a* to assure deenergization of the now deenergized control relay 6CR. The function of relay 6CR will be explained hereinafter.

Energization of the relay BR causes its contact *a* to be opened for releasing any suitable brake control applied to the load L. The circuit for the control of the brake and the brake itself is not shown in this disclosure, since any suitable brake control relay could be used. The closed contact *a* of the relay 1CR completes the main control winding circuit for the magnetic amplifier 17 through the acceleration resistor 50, the value of which has been previously adjusted by the variable tap 52. At the same time the contact *b* of relay 1CR interrupts the previously completed decelerating circuit for the magnetic amplifier through the resistor 51. Current build-up in the main control windings 23 and 24 of the magnetic amplifier 17 is therefore varied over a linear path causing the build-up of current through the shunt field winding 6, due to the change in flux in the magnetic amplifier 17. The change in flux of the magnetic amplifier 17 causes an increase of current through the load windings 18 and 19 during opposite half cycles of the supply frequency on the conductors 3. The increase of current through the load windings is then applied through the full-wave rectifier 2RX to the shunt field winding, through the resistors 38, 37, and 35 over the circuit as previously recited. In parallel with the shunt field winding is the resistor 36 which aids in limiting the build-up of flux in the generator shunt field 6. The rate-of-change in current flow through the load windings 18 and 19 to the shunt field 6 over the previously recited circuit causes a rate-of-change voltage to take place in the windings 20, 21, and 22. This voltage is a bucking voltage providing an opposing flux to the flux build-up in the magnetic amplifier 17. The negative feedback bucking voltage in these windings, however, is insufficient to prevent the magnetic amplifier from moving toward saturation, but is sufficient to control or aid in control of the rate at which the magnetic amplifier moves to saturation. In addition, the winding 25 in the magnetic amplifier 17 begins to supply positive feedback flux to the magnetic amplifier in order to obtain a desired rate of flux build-up in the magnetic amplifier. This rate of build-up of positive feedback voltage in the winding 25 can be varied by the variable tap 47 on the resistor 46 and is proportional to the voltage appearing across resistor 38. The effective value is adjusted to a level to aid build-up of flux in the magnetic amplifier proportional to load current supplied to the shunt field 6. Since it is desirable to accelerate the load L through the acceleration of the motor 11 from zero to a maximum speed over a linear smooth acceleration path preferably of a fixed time duration, the main control windings 23 and 24 of the magnetic amplifier 17 are supplied with an excitation current through the resistor 50 having a variable tap 52 capable of establishing the rate of current build-up in the main control windings 23 and 24. This value is preset for any one operation to give the rate-of-change of flux within the magnetic amplifier 17 to provide the rate-of-change of flux build-up in the shunt field winding 6 over a linear smooth response curve. This build-up of flux in the shunt field winding 6 is not dependent upon armature current drawn through the armature of the generator 5. For this reason, if the load applied to the generator 5 is somewhat variable, the shunt field excitation is not effected therefore allowing the generator to increase its output in a linear manner in response to the shunt field. If the load is increased for some unknown reason, the series field 7 of the generator 5 would provide any additional excitation needed to provide increased output from the generator 7 to carry the additional load. The excitation of the series field 7 is naturally directly proportional to the armature current delivered by the generator 5.

It is pointed out that the resistor 31 placed in shunt relationship to the load windings 18 and 19 is provided to maintain a minimum excitation of the shunt field at all times following the application of power to the motor 2 of the motor generator set. It is also pointed out that the application of excitation of the shunt field 6 of the generator 5 by the magnetic amplifier 17 causing an output on the generator conductors 8a and 9a also applies current over the conductors to the brake control relay BRCR causing this relay to be energized through its winding 73 and further causing it to open its contacts a and b. The relay BRCR is also provided with a bias control winding 74 that is normally energized at all times. This bias is used to provide adequate rapid operation of the brake control relay BRCR. The winding 74 is energized by being connected to the conductors 62 and 64 through a current limiting resistor 75 having a variable tap 76 for adjusting the amount of bias applied to the relay BRCR. The opening of the contact a of the relay BRCR interrupts any possible pickup path for the control relay 3CR, the purpose of which is explained hereinafter. Similarly, the contact b of the relay BRCR interrupts the energizing path for the relay 5CR, the purpose of which will be explained hereinafter. The interruption of the energizing circuit for the winding 77 of the relay 5CR causes the relay to be deenergized, closing its contact a, opening its contact b, and opening its contact c. Closing of the contact a provides an additional closed circuit in the stick circuit for the contactor F eliminating the contacts a of the forward jog and reverse jog contacts as a part of the stick circuit for the forward relay F. Accidental operation of the forward jog or reverse jog contacts at this time therefore have no effect on the forward contactor F. The contact b of the relay 5CR being in an open position at this time also interrupts the possible pickup circuit for the jog control relay JCR. Continued deenergization of the JCR relay prevents any jog control to be applied to the control circuit. The opening of the contact c of the relay 5CR provides an additional interruption of the stick circuit for the relay 5CR, that is previously interrupted by the now open contact g of the relay 1CR. Although the contact g had been open upon the energization of the relay 1CR, the relay 5CR remained energized over the contact b of the relay BRCR. A build-up of output from the generator 5, however, energizing the relay BRCR causes the contact b of this relay to interrupt the energizing circuit for the relay 5CR, and with the stick circuit being open by the contact g of relay 1CR, the relay 5CR naturally becomes deenergized.

When the maximum output voltage of the magnetic amplifier is reached, the motor 11 will reach its maximum speed and maintain the speed until such time deceleration is provided. Motor operation at the maximum speed will continue until the cam contact switch a is opened through the mechanical connection 72 and moves the cam contact a to its open position in response to load rotational position. The cam contact switch b is also actuated by the mechanical linkage 72 at this time and is moved closer to contact, but remains in the open position. Opening of the contact switch a interrupts the previously traced stick circuit for the relay 1CR, causing the relay 1CR to become deenergized. Deenergization of the relay 1CR causes its contact a to become open and its contact to become closed. This interrupts the accelerating control through the resistor 50 and closes the decelerating circuit through the high value resistor 51. The main control of the magnetic amplifier 17 is therefore in a direction to move away from maximum saturation toward a minimum point in response to the current supplied through the resistor 51 to the main control windings 23 and 24.

As saturation flux is departed from in the magnetic amplifier 17, a decrease in flux in the shunt field 6 takes place causing a proportional decrease in output current from the generator 5 to the motor 11. The decrease continues over a linear curve established by the decelerating resistor 51 until the mechanical linkage 72 of the cam contact switch causes the contact b of the contact switch to become closed. At the same time the voltage drop resulting from the decelerating control of the magnetic amplifier 17 on the conductors 8 and 9 causes the relay BRCR to become deenergized causing its contacts a and b to become closed. With relay 1CR now in its deenergized condition and the brake control relay also in its deenergized condition and the contact switch b closed in response to a load rotational position, a pickup circuit for the control relay 3CR is established over the contact switch b in closed position, back contact e of the relay 1CR in closed position, the contact a of the relay BRCR in closed position, the winding 78 of the relay 3CR all connected across the conductors 62 and 64. Energization of the relay 3CR causes its contacts a and c to become open and its contacts b, e and d to be closed. The opening of the contact a of the relay 3CR disconnects the magnetic amplifier from the shunt field 6 and the closing of the contacts b and e differentially connects the shunt field winding 6 across the output conductors 8 and 9 of the generator 5 through the conductors 79 and 80. The conductor 80 has connected in series therewith a current limiting resistor 81 having an adjustable tap 82 that can be preset to a desired current limiting value. Circuit for the shunt field 6 can be traced from one terminal of the generator 5, the conductor 8a, through the conductor 80, the resistor 81, the now closed contact e of the control relay 3CR, the contact c of the relay JCR, the winding of the shunt field 6, the contact b of the relay JCR, the now closed contact b of the relay 3CR, the conductors 79 and 9a, to the other terminal of the generator 5 armature.

The closing of the contact d of the relay 3CR completes a stick circuit around the cam contact switch b in the energizing circuit for the relay 3CR. This maintains the relay 3CR energized until the relay 1CR or the brake control relay BRCR becomes energized at some subsequent time. The generator now decreases its own output by increasing excitation on the shunt field 6 in a direction to oppose normal build-up.

When the relay 3CR became energized, its contact f became closed completing the pickup circuit for the timing relay BRTD. The timing relay BRTD begins its time out period immediately on becoming energized. Upon the completion of its time out period, timing relay BRTD moves its armature opening its normally closed contact a, causing the interruption of the previously energized circuit for the control relay 7CR. When the control relay 7CR becomes deenergized, its contact a interrupts the previously described energizing circuit for the brake relay BR and the control relay 4CR. Deenergization of the brake relay BR therefore applies the mechanical brake to the load and brings it to a complete and full stop.

It is sometimes desirable to stop the drive of the load L at some point in between the limits set up by the mechanical linkage 72 driven cam contact switches a and b. In order to accomplish this, the stop switch 69 is depressed by the operator breaking its normally closed contact a, causing interruption of the now energized relay 1CR. Interruption of the energizing circuit for the relay 1CR deenergizes the relay and applies decelerating control to the magnetic amplifier 17 in the manner previously described in connection with a normal stop dictated by the cam contact switch a. Pressing of the stop contact button 69 also closes its contact b completing an energizing circuit for the relay 2CR. The energizing circuit can be traced from the power conductor 62 through the now closed contact b of the stop switch 69, the winding of the relay 2CR, to the conductor 64. Movement of the armature of the relay 2CR in response to its energization causes its contact a to close completing a stick circuit for the relay 2CR. The stick circuit can be traced from the conductor 62 over the now closed contact d of the relay 1CR in its deenergized condition, the closed contact a of the relay 2CR, the winding of the relay 2CR, to the conductor 64. The normally open contact b of the relay 2CR then becomes closed, and as soon as the output voltage from the generator 5 has dropped to a value insufficient to maintain the relay BRCR energized, the relay BRCR becomes deenergized closing its back contact a and completing a pickup circuit for the relay 3CR, the pickup circuit now being from the conductor 62 over the now closed contact b of the relay 2CR, the closed contact a of the relay BRCR, the winding of the relay 3CR, to the conductor 64. The relay 3CR therefore connects the generator shunt field 6 to the output conductors of the generator in a degenerative manner as previously explained. The contact c of the relay 2CR energizes the relay 6CR over a series circuit including the closed contact a of relay 4CR and the winding of relay 6CR. The relay 6CR assumes that the start button cannot cause an action and prepares the forward relay for deenergization as soon as the generator voltage has reduced to a small value in the bias winding 67. The remainder of the stop operation is identical with the normally cam position dictated stop described hereinbefore.

In order to provide normal automatic operation of the system, it is necessary to jog the load to a position at which the cam switches are in their normal operating condition. The motor and load can be jogged either forward or reverse, as described hereinafter.

To forward jog the motor and load, the operator merely depresses the forward jog control button FJ. The forward jog button through its contact a interrupts the normal automatic control energization circuit for the forward control relay F associated with the motor 11. This circuit is interrupted, since the relay 5CR is in its energized condition over a circuit established by the contact b of this now deenergized relay BRCR. The manual depression of the forward jog button FJ interrupts the only remaining stick circuit for the forward control relay F. The contact b of the forward jog button then becomes closed providing a new pickup circuit for the forward control relay F that can be traced from the power conductor 62 over the now closed contact a of the relay 6CR deenergized due to the deenergization of relay 2CR, the now closed contact b of the forward jog button FJ, the closed contact c of the reverse control contactor R, the winding 63 of the forward control relay F, to the power conductor 64. This establishes the connections between the generator and motor 11 for forward movement of the motor 11. At the same time the forward jog contact c is closed completing a pickup circuit for the jog relay JCR that can be traced from the power conductor 62, over the now closed contact c of the forward jog button FJ, the closed contact b of the now energized relay 5CR, the winding of the jog relay JCR, the conductor 71, to the power conductor 64. The now closed contact a of the jog relay JCR completes a pickup circuit for the brake control relay BR causing a release of the brake by interruption of its closed contact a. The energizing circuit for the relay BR can be traced from the power conductor 62 through the now closed contact a of the relay JCR, the winding of the relay BR, the current limiting resistor 83, to the power control 64. At the same time, relay 4CR is energized over the previously mentioned closed contact a of the jog relay JCR causing the relay 4CR contact a to interrupt any possible pickup circuit for the control relay 6CR. Energization of the jog relay JCR, causing its contacts a and d to be closed and contacts b and c to be opened in the circuit to the shunt field winding 6 of the generator 5, provides connections between the variable tap 59 on the resistor 36 and the resistor 57, causing any current flow from the rectifier 2RX to flow through the rheostat 35 and resistor 36 with a portion of the resistor 36 having the shunt field connected in parallel therewith. This means that the voltage between the tap 59 on the resistor 36 and the tap 58 on the resistor 57 is of far less value than the original voltage developed between the tap 55 on the rheostat 35 and the tap 58 on the resistor 57 utilized during normal operation. In addition, during this jog operation, the magnetic amplifier 17 is maintained normally inoperative, and the excitation of the shunt field 6 occurs only due to current being bypassed around the load windings 18 and 19 of the magnetic amplifier 17 by the resistor 31. This minimum excitation is just sufficient to cause very slow jogging operation or drive of the motor 11 in response to the generator 5 output.

Reverse jogging may also be accomplished by depressing the reverse jogging button RJ at a time when the load and motor have been stopped at a position somewhere between the normal cam designated positions. To reverse jog it is merely necessary to depress the RJ button interrupting any possible pickup circuit for the forward control contactor F and establishing a pickup circuit by the contact b of the jog button for energizing the reverse control relay R. The energizing circuit for the reverse control relay can be traced from the conductor 62, through the contact a of the relay 6CR, the contact b, now closed, of the reverse job button, the contact d now closed, of the forward direct relay F, the winding of the reverse relay R, to the power conductor 64. It is pointed out at this time that the reverse relay R is provided with a bias winding 84 connected across the conductors 66 and 65 feeding power to the motor 11. This bias winding therefore aids in maintaining the reverse relay in its operative condition during normal motor control operation. Energization of the reverse contactor R causes its contact c to further interrupt the pickup circuit for the forward contactor F to assure that this relay cannot be energized. The contacts a and b of the reverse contactor R provide respective field reversal with respect to armature current in the motor 11 to provide reverse rotation. Contact c of the jog control button RJ becomes closed when the button is depressed providing an energizing circuit for the jog relay JCR. The pickup circuit for JCR can now be traced from the conductor 62 through the now closed contact c of the jog button RJ, the closed contact b of the control relay 5CR, in its energized condition, the winding of relay JCR, the conductor 71, to the power conductor 64. It can be seen, therefore, that the motor 11 is conditioned to drive in a reverse direction with the jog control relay JCR energized to provide minimum excitation to the generator 5 in the manner described hereinbefore. In either case, whether the jogging operation be made forward or reverse, the jog operation can be stopped upon the release of the particular jog button.

Under some conditions, it may be necessary, though not necessarily desirable, to provide an emergency stop to be used in an event of trouble. Since the process involving the load of this system is one requiring gentle acceleration and deceleration in order to provide normal process control, it should be clear that an emergency stop might well damage the process carried on and therefore should be used only in emergency conditions. Depression of the emergency stop button 85 removes control currents from all of the control relays causing every relay to be deenergized. Deenergization of the BR relay results in an application of the brake to the load resulting in a very sudden stop. In order to warm up the system, a warmup control button WB is provided having a contact *a* for energizing the forward contactor F and a contact *b* for energizing the control relay 1CR for generator field 6 control.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. A control circuit for providing substantially linear acceleration and deceleration speed control of a motor comprising, a direct current generator having a shunt field, prime mover means for driving said generator, a direct current motor connected to said generator, a magnetic amplifier having main and at least two control windings, said shunt field being connected to be energized by said main winding of said magnetic amplifier, first regulating means for one of said control windings for controlling the rate of flux change in said magnetic amplifier, said first regulating means providing linear control of said magnetic amplifier driving the magnetic amplifier linearly toward saturation during acceleration periods, second regulating means operative with said one control winding, first control means for selectively connecting one of said first and second regulating means to said one control winding, said second regulating means being connected during decelerating periods, said first and second regulating means being potentiometers capable of being separately adjusted to establish the rate of acceleration and deceleration, and second control means operative with the other of said control windings and being responsive to any current change in said shunt field for controlling the energization by said magnetic amplifier of said shunt field.

2. A control circuit for providing substantially linear acceleration and deceleration speed control of a motor comprising, a direct current generator having a shunt field, prime mover means for driving said generator, a direct current motor connected to said generator, a magnetic amplifier having main and at least first and second control windings, said shunt field being connected across said main winding of said magnetic amplifier, first regulating means for said first control winding for controlling the rate of flux change in said magnetic amplifier, said first regulating means providing linear control of said magnetic amplifier driving the magnetic amplifier linearly toward saturation during acceleration periods, second regulating means, first control means for selectively connecting one of said first and second regulating means to said first control winding, said second regulating means being connected during decelerating periods, second control means operative with said second control winding and being operatively connected to said shunt field for responding to any change in the current through said shunt field for controlling the energization of said shunt field by said magnetic amplifier, and slow speed control means comprising an impedance means connected to bypass said shunt field around said magnetic amplifier to at selected times provide minimum speed operation without said magnetic amplifier.

3. A control circuit for providing substantially linear acceleration and deceleration speed control of a motor comprising, a direct current generator having a shunt field, prime mover means for driving said generator, a direct current motor connected to said generator, a magnetic amplifier having main and control windings, said shunt field being connected across said main winding of said magnetic amplifier, first regulating means for said control winding for controlling the rate of flux change in said magnetic amplifier, said first regulating means providing linear control of said magnetic amplifier driving the magnetic amplifier linearly toward saturation during acceleration periods, second regulating means, control means for selectively connecting one of said first and second regulating means to said control winding, said second regulating means being connected during decelerating periods, a rate-of-change control winding on said magnetic amplifier, said rate-of-change control winding being connected in the circuit of said shunt field to establish an opposing flux in said magnetic amplifier in response to the rate of current change in said shunt field, and positive feedback winding means on said magnetic amplifier, said positive feedback means being connected in the circuit of said shunt field to provide a positive feedback that is directly proportional to the energy applied to said shunt field.

4. A drive which is to be accelerated or decelerated without abrupt changes in speed including a motor, a generator having a field winding and an armature, means connecting said armature in energizing relationship with said motor, magnetic-amplifier means having output winding means, control winding means, first auxiliary winding means and second auxiliary winding means, means connecting said output winding means in field excitation controlling relationship with said field winding, controlling power supply means, means connected to said controlling means for selectively connecting said controlling means in ampere-turns controlling relationship with said control winding means to vary said ampere-turns to increase or decrease the excitation of said field winding means so as to accelerate or decelerate said motor, means connecting said field winding to said first auxiliary winding means to impress thereon ampere-turns dependent on the rate of change of the field current, said last-named ampere-turns tending to oppose the ampere-turns through said output winding means, means connecting said field winding to said second auxiliary winding means to impress thereon ampere-turns dependent on said field current, said last-named ampere turns tending to increase the effect of the ampere turns through said output-winding means, said selective connecting means, said means for impressing ampere turns, on said first-auxiliary winding means and said means for impressing ampere turns on said second auxiliary winding means each having ampere turns adjusting means so set that the acceleration or deceleration of said motor is free of abrupt changes in speed.

5. A drive which is to be accelerated or decelerated without abrupt changes in speed including a motor, a generator having a field winding and an armature, means connecting said armature in energizing relationship with said motor, magnetic amplifier means having output means connected to control the excitation of said field winding, controlling power supply means connected to said magnetic amplifier means for controlling the amplifier means to produce a change of speed of said drive, and rate-of-change negative feedback and positive feedback connections from said field winding to said magnetic amplifier means for producing feedback values providing smooth changes of speed of said drive.

6. A drive which is to be accelerated or decelerated without abrupt changes in speed including a motor, a generator having a field winding and an armature, means connecting said armature in energizing relationship with said motor, magnetic amplifier means having output means connected to control the excitation of said field winding, controlling power supply means having a first output for producing high current and a second output for producing low current, means connected to said amplifier means and to said controlling power-supply means for selectively and abruptly impressing said first output or said second output on said magnetic amplifier means to produce acceleration or deceleration of said drive respectively, and rate-of-change negative feedback and positive feedback connections from said field winding to said magnetic amplifier means, said connections including means for setting the feedback to provide substantially smooth acceleration and deceleration of said drive.

7. A drive which is to be accelerated or decelerated without abrupt changes in speed including a motor, a generator having a field winding and an armature, means connecting said armature in energizing relationship with said motor connected to control the excitation of said field winding, magnetic-amplifier means having output means connected to control the excitation of said field winding, controlling power supply means, means connected to said controlling means for selectively connecting said controlling means in ampere-turns controlling relationship with said magnetic amplifier means to vary said ampere-turns to increase or decrease the excitation of said field winding means so as to accelerate or decelerate said motor, means coupling said field winding to said magnetic amplifier means to impress thereon negative feedback ampere-turns dependent on the rate of change of the field current, coupling said field winding to said magnetic amplifier means to impress thereon positive feedback ampere-turns dependent on said field current, said selective connecting means, said means for impressing negative feedback ampere-turns, and said means for impressing positive feedback ampere-turns each having ampere-turns adjusting means so set that the acceleration or deceleration of said motor is free of abrupt changes in speed.

8. A control system for substantially linearly energizing a load, said system comprising a load, magnetic amplifier means having output means connected to energize said load, controlling power supply means connected to said magnetic amplifier means for controlling the amplifier means to produce a change of energization of said load, and rate-of-change negative feedback and positive feedback connections from said load to said magnetic amplifier means for producing feedback values providing smooth changes of load energization.

References Cited in the file of this patent

UNITED STATES PATENTS

| | | |
|---|---|---|
| 2,542,843 | Shaw | Feb. 20, 1951 |
| 2,586,284 | Abell | Feb. 19, 1952 |
| 2,634,811 | Schaelchlin | Apr. 14, 1953 |
| 2,663,833 | Fisher | Dec. 22, 1953 |
| 2,709,776 | Evans et al. | May 31, 1955 |
| 2,740,087 | Roberts | Mar. 27, 1956 |
| 2,788,479 | Montgomery | Apr. 9, 1957 |